United States Patent [19]

Zimmer

[11] Patent Number: 4,729,756
[45] Date of Patent: Mar. 8, 1988

[54] ROLLER CHAIN
[75] Inventor: George A. Zimmer, Ithaca, N.Y.
[73] Assignee: Emerson Electric Co., St. Louis, Mo.
[21] Appl. No.: 8,385
[22] Filed: Jan. 29, 1987
[51] Int. Cl.⁴ .............................................. F16G 13/06
[52] U.S. Cl. ..................... 474/214; 474/91; 474/231
[58] Field of Search ............... 474/206, 209, 212, 214, 474/229, 231, 91; 59/78, 4; 384/286, 291, 292, 273, 398, 399

[56] References Cited

U.S. PATENT DOCUMENTS

| 583,854 | 6/1897 | Wood | 474/91 |
| 1,385,968 | 7/1921 | Newhouse | 474/91 |
| 1,925,055 | 8/1933 | Mize | 474/231 |
| 2,049,841 | 8/1936 | Kjaer | 474/229 |
| 2,113,980 | 4/1938 | Brill | 474/91 |
| 2,185,702 | 1/1940 | Bremer | 474/91 |
| 2,241,820 | 5/1941 | Kohn | 474/91 |
| 3,336,089 | 8/1967 | Krickler | 474/91 X |
| 3,841,716 | 10/1974 | Webber et al. | 474/91 X |

Primary Examiner—James A. Leppink
Assistant Examiner—Thuy M. Bui
Attorney, Agent, or Firm—Aubrey L. Burgess

[57] ABSTRACT

A roller chain in which the pins are provided with at least one longitudinal groove oriented toward the bushing seams to improve the lubrication of the pin-bushing interface.

10 Claims, 9 Drawing Figures

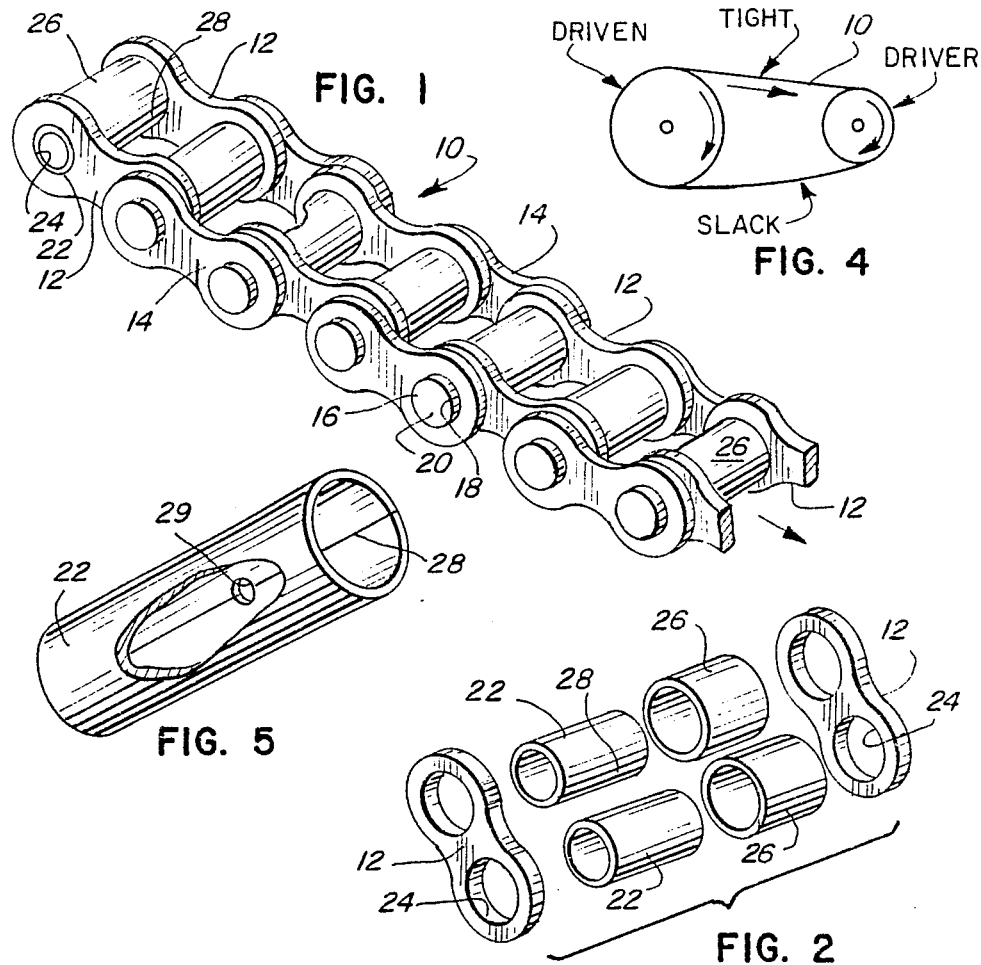
FIG. 1
FIG. 4
FIG. 5
FIG. 2
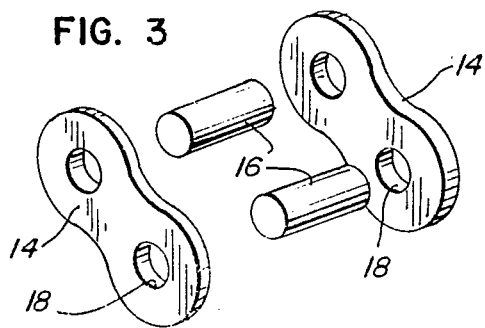
FIG. 3

ROLLER CHAIN

FIELD OF THE INVENTION

This invention relates to improvement in the construction of roller chain.

BACKGROUND OF THE INVENTION

Roller chain comprises an assembly of laterally spaced pairs of roller link plates joined by bushings which are press fitted into apertures in the roller link plates, and laced together with pairs of laterally spaced pin link plates flanking the roller link plates. Pins passing through the bushings and through apertures in the pin link plates join adjacent roller link plates assemblies. Various methods may be employed to integrate the assembly, as for example, upsetting the ends of the pins, using headed pins or retaining washers and/or cotter pins, depending upon a press fit, etc. A roller surrounds and is rotatable about each bushing; a roller being assembled onto a bushing during the press fitting operation. The chain may be assembled in continuous lengths, after which sections are broken out and the ends of a section are joined, usually by a connecting link, to make an endless chain for use in a chain-sprocket drive. At other times, the chain is assembled in an endless configuration. Automatic or semi-automatic machinery may be used to manufacture roller chain, or the chain can be assembled by hand.

Bushings are formed by curling and die forming finite lengths of steel strip into circular cylinders by processes known in the art. The particular process described for forming the bushings is, in the applicant's opinion, the best and most economical, but other processes can be used if desired. It is important to note that each bushing so formed includes a seam where the ends of a finite length of strip meet. In some chain assembly processes, the formed bushings are assembled randomly with the roller link plates while in other chain assembly processes the formed bushings are oriented so that the seams are located on the side of the bushing which does not carry a load from the pin. When the assembly process includes orientation of the bushings, each finite length of stock, when cut, is provided with an indentation or cut-out, generally centrally located at the cut, so that when the bushing is formed, an opening or slot is provided. The smaller pitch chains usually include the slot while larger pitch chain may include a generally circular, diamond shaped, or rectangular opening. The slot or opening is bisected by the seam at the juncture of the ends of the strip. Orientation of the bushings is accomplished by using equipment which engages the slot or opening and which then positions the bushings for press fitting into the roller side plates.

Roller chain horsepower capacity is limited by several factors, i.e., link plate fatigue, roller-bushing impact, and pin-bushing galling. In larger sizes of roller chain (1½ inches pitch and larger) used for industrial applications, the pin-bushing galling factor affects the major part of the horsepower capacity curves or tables. Studies relating to speed limits at which galling begins have been made. However, practical experience permits drives using roller chain to operate at higher speeds than those indicated by the studies with some galling. Operation at these higher speed limits can be accomplished with careful attention to lubrication and cooling, but of course, with some risk of failure.

Because the galling limit affects a considerable part of the horsepower curve, anything done to increase the maximum operating speeds will increase the potential applications of roller chain in the market place, and will have economic benefits to the manufacturer and also to the users of roller chain.

The pin and bushing of roller chain constitute a journal bearing assembly, and thus journal bearing analytical procedures are applicable with some special limitations. The pin-bushing is not a rotating bearing in the same sense as a journal bearing but rather oscillates as the chain articulates when entering and leaving the sprockets with which it is coupled as a drive. Maximum articulation of the joint (the pin-bushing) is approximately 20 degrees or less as the number of teeth in the sprocket increase. When the pin-bushing (joint) is in the tight or driving strand, the nominal bearing pressure, i.e., strand pressure divided by projected area of pin-bushing, may reach levels in excess of 5000 psi. In the tight strand at these pressures, essentially metal-to-metal contact is present. Bushing barrelling, the deformation of a bushing into a barrel-shaped member having reduced diameter ends, which results from the press fitting of the bushing into the roller link plates and surface asperities present on the pin and bushing result in still higher unit pressures.

Studies have shown that during articulation, a hydrodynamic film or at least a partial hydrodynamic film is generated at the pin-bushing interface. If the supply of oil or other lubricant to the pin-bushing contact area can be enhanced and/or increased, the initiation of the film will start earlier in the articulation and provide enhancement of the lubrication of the joint.

The invention herein described provides for enhanced lubrication of the pin-bushing interface and thus permits the higher speed use of roller chain without encountering serious galling problems and without a material increase in the cost of manufacturing the chain.

DISCUSSION OF PRIOR ART

Newhouse, U.S. Pat. No. 1,385,968, granted July 26, 1921, teaches a lubricating device for chain pins in which the pins and bushings are provided with passageways for the passage of grease to the interface of the bushing and the roller. Primarily the arrangement provides lubrication of the bushing-roller interface.

Kjaer, U.S. Pat. No. 2,049,841, granted Aug. 4, 1936, relates to a chain in which oil is supplied to the interior of a pin and then through passageways to flats on the pin and to flats on the exterior of the bush. The passageways in the pins traverse the pins from surface to surface and the passageways in the bush are aligned with those in the pins.

Brill, U.S. Pat. No. 2,113,980, granted Apr. 12, 1938, teaches a chain in which the pins or pintles are each provided with a pair of "grooves" which resemble flats, such as to leave "a continuous unbroken cylindrical bearing surface of approximately 180 degrees arc afforded between the cylindrical body of the pintle 15 and the inner bearing surface of the thimble 17." The grooves terminate short of the full length of the pintles, providing a complete cylinder at each end of the main body, inwardly of the shoulders which pass through the secondary links.

Kohn, U.S. Pat. No. 2,241,820, granted May 13, 1941, relates to a roller chain in which the bolts 11 are provided with grooves on the exterior surface communicating with a central passageway into which grease is injected, providing lubrication for the boltsleeve interface. The sleeves are also provided with opposed passageways for grease passage. The links in the chain have trunions surrounding the sleeve, such that there can be relative rotation between the links and the sleeves and the bolts. The bolts are connected to rollers rolling on a track. This is not a typical roller chain of the American or British Standard configurations.

Krickler, U.S. Pat. No. 3,336,089, granted Aug. 15, 1967, relates to a crawler tractor chain in which each pin is provided with a central longitudinal passageway and reservoir, and a pair of spaced radial passageways terminating at the surface in slots. Lubrication is forced under pressure into the interior of the pins and then into the area between the pins and the bushing surfaces through the passageways and slots.

Webber et al, U.S. Pat. No. 3,841,716, granted Oct. 15, 1974, relates to a track joint in which the pin is knurled over its entire surface to form a plurality of intersecting grooves thereon to communicate lubricant between the pin and the bushing.

THE INVENTION

According to the present invention, one or more grooves are formed in the pins of roller chain to provide for retention and circulation of lubricant in the pin-bushing joint. Unlike the prior art above described, the groove or grooves are oriented to face away from the load, i.e. toward the unloaded side of the bushing. Preferably the bushings are also oriented with their seams facing away from the load, and thus the groove or grooves in the pins are oriented to face the seams.

It is proposed, according to this invention, to provide a groove or grooves in the surface of the pins with the particular pattern being rolled into the pins before they are hardened and ground. In any event, the groove or grooves terminate short of the ends of the pins, and when assembled with a bushing, short of the ends of the bushing. By orienting the groove or grooves toward the unloaded side of the bushing, a larger supply of lubricant can be retained between the pin and the bushing. Also, by terminating the groove or grooves near the ends of a bushing where galling normally begins on the pins and bushings, an additional quantity of lubricant is supplied to this critical area and the onset of galling will be extended. In addition, because of the slots or openings provided in the bushings by which the bushings are orientated, as described before, lubrication is also provided to the bushing-roller interface through the openings or slots.

Various patterns of grooves will be described which accommodate articulation of the joint in either direction going on or off the sprockets of the drive.

BRIEF DESCRIPTION OF THE DRAWINGS

FIG. 1 is an isometric view of a section of roller chain of the American Standard variety with kidney shaped links;

FIG. 2 is an exploded view of roller link plates, bushings and rollers incorporated into the chain of FIG. 1;

FIG. 3 is an exploded view of pin link plates and pins incorporated into the chain of FIG. 1;

FIG. 4 is a schematic illustration of a chain drive system showing the tight and slack sides of the chain with the direction of load indicated by an appropriate arrow;

FIG. 5 is an enlarged isometric view with parts broken away, of a typical roller chain bushing showing the seam where the ends of the strip meet;

DETAILED DESCRIPTION OF THE PREFERRED EMBODIMENTS

Figure 6:
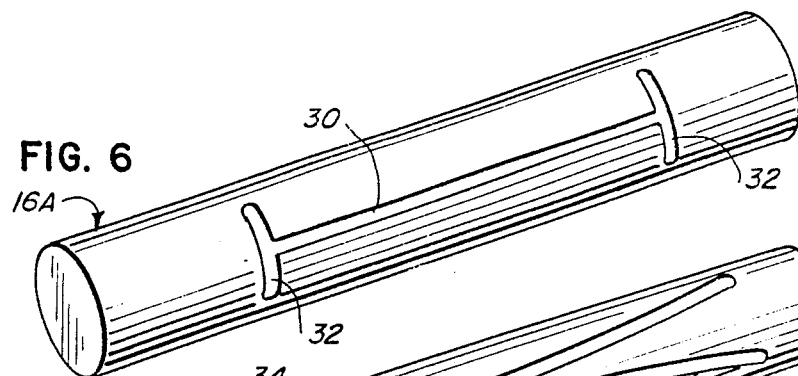
FIGS. 6, 7, and 8 are enlarged views showing pins with various groove patterns therein.

FIGS. 1 to 3 of the drawings illustrate a section of an American Standard roller chain 10, comprising roller link plates 12 and pin link plates 14 joined together by pins 16. The pins 16 pass through apertures 18 in the pin link plates 14 and are upset at their ends 20. The pins 16 are journaled in bushings 22 press fitted into apertures 24 in the roller link plates 12. Rollers 26 surround the bushings 22 and contact the sprocket tooth spaces of the sprockets (not shown in detail) in the drive in which the chain is used. The chain 10 in use is a continuous loop, the ends of a section of chain being joined by a connecting link, as well known in the art. The bushings 22, see also FIG. 5, are formed by curling and die forming finite lengths of strip steel and thus each has a longitudinal seam 28, and, because indentations or cut-outs are made at the ends of the finite lengths of strip steel, openings 29 (or slots when the bushings are relatively small for smaller pitch chain) are formed, generally centrally of the bushing and which are intersected by the seams. During the assembly of the various parts of the chain into the finished product, it is common practice and preferable to orient the bushing seams in such a manner that the seam will not take the load from the pin. Orientation of the bushings is accomplished by chain assembly apparatus engaging the openings 29 and rotating the bushings to their proper positions as is necessary. Thus seams 28 are located on the unloaded side of the chain's joints, i.e., the pin and the bushing. As illustrated in FIG. 1, the seams 28 of the bushings in a roller unit face one another, i.e., oriented to the center of the roller unit.

FIG. 4 illustrates, schematically, a chain drive, comprising a pair of toothed sprockets (not illustrated in detail), one being driven and the other being the driver, and a chain 10. The load is directed as per the arrow on the tight strand of the chain while the return side is the slack strand.

In accordance with this invention, the pins 16 are provided with one or more grooves to retain and distribute oil or other lubricant throughout the longitudinal length of the pin-bushing interface, and, the groove or grooves, whichever pattern is selected, are oriented to face the seams of the bushings, thus retaining more lubricant and being more effective than if facing the loaded side of the bushing or away from the seams.

Figure 7:
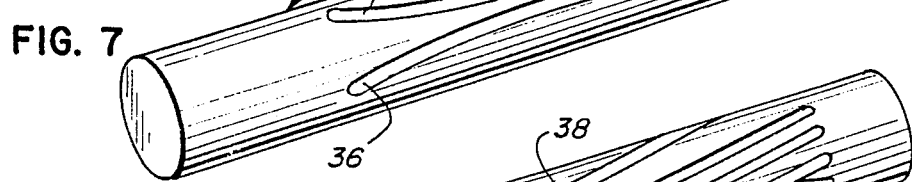
Figure 8:

FIGS. 6, 7 and 8 illustrate pins 16A, 16B and 16C, respectively, each having grooves therein. The grooves terminate short of the ends of the pins and are entirely within the longitudinal length of the bushings. In order to improve the lubrication of the pin-bushing interface near the confined ends of the pins, the grooves extend circumferentially a greater distance than at the longitudinal center thereof.

The pin 16A, FIG. 6, has a single, central groove 30 which terminates in circumferential branches 32. The latter traverse an arc of less than 180 degrees and generally no more than 90 degrees.

The pin 16B, FIG. 7, has a pair of grooves 34 and 36 which are arcuate, each diverging from the other at their ends and being closer to the other at their centers. The ends traverse an arc of no more than 180 degrees and generally less than 90 degrees.

The pin 16C, FIG. 8, has a plurality of crisscross grooves 38 which, again, diverge at their ends and traverse an arc of less than 180 degrees and generally no more than 90 degrees.

The grooves 30, 32, 34, 36 and 38 are formed in the pins by a rolling process before the pins are hardened and ground. Their depth is usually on the order of 5% to 10% of the pin diameter.

Figure 9:
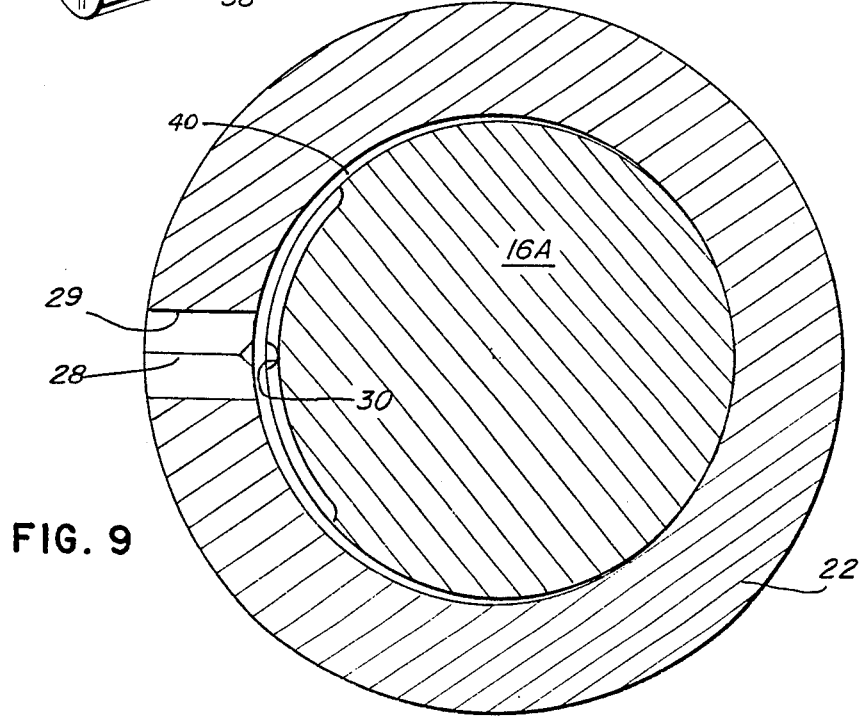
FIG. 9 is an enlarged cross-sectional view through a pin and bushing showing the bushing seam, the orientation opening, and the grooves in the pin.

An inspection and understanding of FIG. 9 will indicate the advantages of this invention in providing a zone for retaining a quantity of lubricant and a means to supply lubricant to the joint as the oscillation of the joint occurs. In the direction of pull, the pin 16 substantially engages the inner surface of the bushing 22, separated by a relatively thin film of lubricant, while at the seam 28, the grooves 30 (or whatever groove pattern is being used) retains a quantity of lubricant which, by the oscillation between the pin 16 and the bushing 22 produces a pumping action by which lubricant is distributed to the interface 40 of the pin and the bushing to improve the formation and maintenance of the film of lubricant at the pin-bushing interface.

While the drawings herein illustrate American Standard roller chain, the invention is equally applicable to British Standard roller chain or roller chain having other link shapes; the difference being the shape of the links and the pin—bushing diameters. The invention is also applicable to other known varieties of roller chain such as those constructed of offset links which are well known in the art.

The appended claims are intended to cover all reasonable equivalents and are to be interpreted as broadly as the prior art will permit.

I claim:

1. In a roller chain adapted to have a load applied longitudinally thereto during its use comprising an assembly of apertured links, bushings which during use have a loaded side and an opposite unloaded side, rollers surrounding the bushings, pins connecting said links and passing through said bushings, said bushings being press fitted at both ends into transversely spaced pairs of alternate sets of links, and said bushings being formed from finite lengths of strip material and having a seam with the seam of being orientated to face one another, the improvement which comprises:

providing at least one longitudinal groove in each pin terminating short of the ends thereof and within the bushing, said at least one groove being orientated to face the seam of the bushing through which it passes and orientated away from the direction of the load on the chain during use.

2. A roller chain as recited in claim 1, in which said at least one longitudinal groove comprises a single groove terminating at each end in a circumferential groove.

3. A roller chain as recited in claim 2, in which said circumferential grooves traverse an arc of less than 180 degrees.

4. A roller chain as recited in claim 3, in which said circumferential grooves traverse an arc of about 90 degrees.

5. A roller chain as recited in claim 1, in which said at least one longitudinal groove comprises a pair of arcuate grooves.

6. A roller chain as recited in claim 5, wherein said pair of arcuate grooves are non-intersecting.

7. A roller chain as recited in claim 6, in which said arcuate grooves traverse a circumferential arc of less than 90 degrees.

8. A roller chain as recited in claim 1, in which said at least one longitudinal groove comprises a plurality of crisscross grooves, some of which intersect others.

9. A roller chain as recited in claim 8, in which said crisscross grooves traverse a circumferential arc of less than 180 degrees.

10. A roller chain as recited in claim 1, in which the depth of said at least one longitudinal groove is on the order of 5% to 10% of the diameter of the pin.

* * * * *

UNITED STATES PATENT AND TRADEMARK OFFICE
CERTIFICATE OF CORRECTION

PATENT NO. : 4,729,756

DATED : March 8, 1988

INVENTOR(S) : George A. Zimmer

It is certified that error appears in the above-identified patent and that said Letters Patent is hereby corrected as shown below:

In Claim 1, column 6, line 7, -- adjacent bushings -- should be inserted before "being".

Signed and Sealed this

Second Day of August, 1988

Attest:

DONALD J. QUIGG

Attesting Officer

Commissioner of Patents and Trademarks